Dec. 5, 1944.                C. D. MACGILL                 2,364,152
                              SIGHT FOR GUNS
                            Filed Jan. 31, 1942

CHARLES
D. LRYMPLE
MACGILL
INVENTOR

BY E. H. Bush
ATTORNEY

Patented Dec. 5, 1944

2,364,152

UNITED STATES PATENT OFFICE 2,364,152

SIGHT FOR GUNS

Charles Dalrymple Macgill, Glasgow, Scotland, assignor to Barr & Stroud, Limited, Glasgow, Scotland Application January 31, 1942, Serial No. 429,079

4 Claims. (Cl. 88—1)

This invention refers to gun sights of the reflector type, i. e. comprising a screen of glass or other transparent material arranged obliquely to the line of sight from the observer to the object under observation and through which the observer views that object, and a lamp which projects light from a graticule in a direction substantially at right angles to the line of sight on to the screen so that an image of the graticule is formed in the observer's line of sight as a result of reflection at the screen, to which image the observer refers the object for sighting purposes.

The object of the invention is to provide in an improved manner for adjustment or setting of the reflector screen relative to the structure on which the sight is mounted.

According to this invention, the sight comprises a sight body containing the lamp and the graticule, and a head which is mounted on the sight body and carries the reflector screen in position to receive light from the lamp at the appropriate obliquity, the sight body having a part which externally is of part-spherical shape, to provide a bearing on which the sight is universally adjustable as a whole within limits. This spherical bearing may provide for what may be regarded as rough adjustment of the reflector screen azimuthally and elevationally. Further provision is made for fine adjustment of the reflector screen. For this purpose, the head may be rotatable on the sight body about the axis of the beam of light falling on the reflector screen from the lamp, so providing for adjustment of the screen about that axis, which generally is vertical, there being means for fixing the head to the body for any position of adjustment. Moreover, the head may support a carrier which carries the reflector screen, with a pivotal connection between the carrier and the head to provide for angular adjustment of the carrier and screen about an axis (generally horizontal) parallel with the screen and at right angles to the plane containing the line of sight and the axis of the beam of light falling on the screen from the lamp, there being means for fixing the carrier in the adjusted position.

The invention will be described with reference to the accompanying drawing, in which.

The sight comprises a lamp casing A, an electric lamp B within the casing A, a tubular neck C extending upwards from the lamp casing A, a base plate K, an arch-shaped sheet metal protective hood or cover D mounted on the base plate K, and an inclined plane glass reflector plate screen E within the hood D, which constitutes a carrier for the plate E. The lamp casing A and neck C constitute what may be regarded as the body of the sight, and the base plate K, the hood D, and the screen E as the head of the sight.

Figure 2:
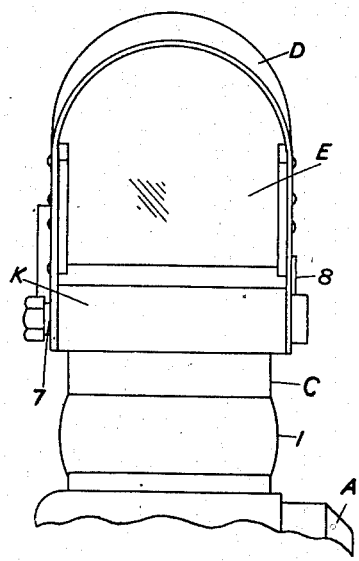
Figure 2 is a view at right angles relative to Figure 1, showing the top part of the sight.
Figure 1:
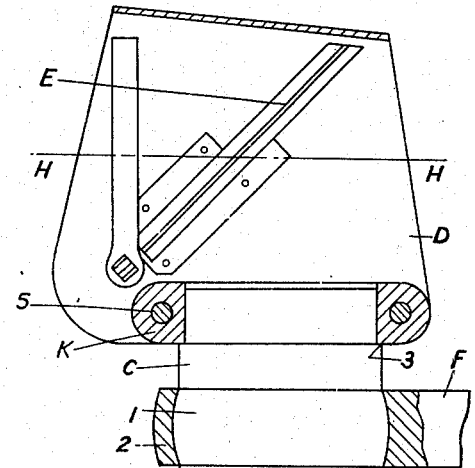
Figure 1 is a side view, partly in section, showing the sight as a whole.

In use, the sight is carried by a bracket F and the observer's eye is to the right of Figure 1, the line of sight being denoted by H—H in Figure 1. Light from the lamp B is projected upwards by way of a graticule (not shown) through the tubular neck C and strikes the glass screen E where reflection occurs. An image of the graticule is thus seen in the line of sight H—H.

For purposes of adjustment, the tubular neck C has an annular portion 1 which is externally of part-spherical form and the bracket F comprises a ring 2 which internally is of corresponding spherical form to provide a bearing for the spherical portion 1 of the neck. The grip of the ring 2 on the neck portion 1 can be varied by means of a clamping screw, and by loosening the clamping screw the sight can be adjusted angularly as a whole relative to the supporting structure and then clamped in the adjusted position.

Figure 3:
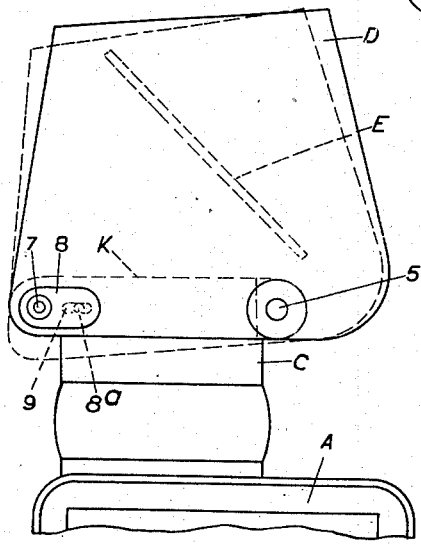
Figure 3 is a view of the top part of the sight as seen from the other side relative to Figure 1.
Figure 4:
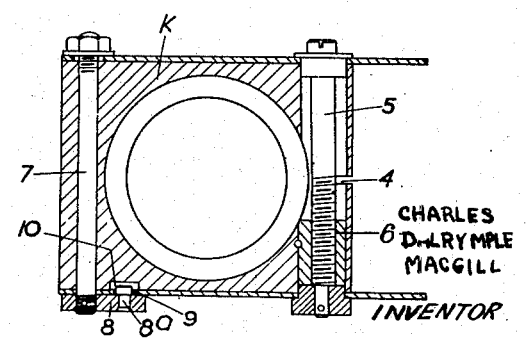
Figure 4 is a sectional plan view showing details of construction.

For fine adjustment of the reflector screen E, the following arrangement is made. The hood D is carried by the base plate K, see Figures 1 and 4. This base plate K is a substantially rectangular metal plate, seen in section in Figure 1, with a circular opening in it to receive the top of the tubular neck C, which has a shoulder 3 on which the base plate K rests, the base plate K constituting a collar on the neck C. At one side (the right hand side in Figure 4) the base plate K is split at 4. The hood D is applied to the base plate K and a stud 5 is passed through the two walls of the hood and through the base plate K. At each end, the stud has a collar fixed on it to bear on the wall of the hood and at an intermediate position 6 the stud is in screw-engagement with the base plate K at one side of the slit 4 so that, on turning the stud, the base plate K can be clamped on the neck C or loosened thereon. In this way, the position of the reflector screen E can be adjusted azimuthally about the axis of the neck C, which is the axis of the beam of light falling on the reflector screen from the lamp B. A pin 7 with a nut at one end is passed through the base plate K and the walls of the hood. At its second end, this pin 7 has a crank arm 8 with a crank pin 8ª which engages with a horizontal slot 9 in the side of the hood D, the base plate K being recessed at 10 to allow of movement of the crank pin 8ª. The openings through which the pin 7 passes at the sides of the hood are somewhat enlarged round the pin. To adjust the position of the reflector screen E, the nut on the pin 7 is loosened and the crank 8 is turned about the axis of the stud so as to raise or lower the crank pin 8ª. As a result of the engagement of the crank pin 8ª with the hood D, the latter is tilted about the axis of the stud 5. The upper and lower limits of tilting movement are indicated by dotted lines in Figure 3. When the desired position of elevational adjustment is reached, the nut is tightened so as to clamp the hood D and reflector E in the required position.

I claim:

1. A gun sight of the reflector type as defined, comprising a sight body containing a lamp, a head mounted on said body, which head includes a base, a carrier supported on the base, and a reflector screen supported by the carrier in position to receive light from the lamp at the appropriate obliquity, the sight body having a part which is externally of part-spherical shape to provide a bearing on which the sight is adjustable universally as a whole within limits, the head being rotatable as a whole on the sight body about the axis of the beam of light falling on the screen from the lamp, to provide for adjustment of the screen about that axis, means for fixing the head to the body for any position of such adjustment, a pivotal connection between the carrier and the base of the head to provide for angular adjustment of the reflector screen about an axis parallel with the screen and at right angles to the plane containing the line of sight and the axis of the beam of light falling on the screen from the lamp, and means for fixing the carrier in adjusted position on the base.

2. A gun sight of the reflector type as defined, comprising a sight body containing a lamp, a head mounted on said body, which head includes a base, a carrier supported on the base, and a reflector screen supported by the carrier in position to receive light from the lamp at the appropriate obliquity, the sight body having a part which externally is of part-spherical shape to provide a bearing on which the sight is adjustable universally as a whole within limits, and the sight body and the base of the head each having a cylindrical portion, the one cylindrical portion to fit inside the other to provide a mounting for rotational movement of the head on the sight body about the axis of the beam of light falling on the screen from the lamp, means for clamping the base to the body in adjusted position, a pivotal connection between the carrier and the base to provide for angular adjustment of the screen about an axis parallel with the screen and at right angles to the plane containing the line of sight and the axis of the beam of light falling on the screen from the lamp, and means for fixing the carrier in adjusted position on the base.

3. A gun sight of the reflector type as defined, comprising a sight body containing a lamp, a head mounted on said body, which head includes a base, a carrier supported on the base, and a reflector screen supported by the carrier in position to receive light from the lamp at the appropriate obliquity, the sight body having a part which externally is of part-spherical shape to provide a bearing on which the sight is adjustable universally as a whole within limits, a pivotal connection between the carrier and the base of the head to provide for angular adjustment of the reflector screen about an axis parallel with the screen and at right angles to the plane containing the line of sight and the axis of the beam of light falling on the screen from the lamp, a finger-operated crank device mounted in the head and operating about an axis parallel with the said pivotal axis and engaging with the carrier, by angular movement of which crank device the carrier is moved about the said pivotal axis, and means for fixing the crank device in adjusted position.

4. A gun sight of the reflector type as defined, comprising a sight body containing a lamp, a head mounted on said body, which head includes a base, a carrier supported on the base, and a reflector screen supported by the carrier in position to receive light from the lamp at the appropriate obliquity, the sight body having a part which externally is of part-spherical shape to provide a bearing on which the sight is adjustable universally as a whole within limits, and the sight body having an externally cylindrical portion and the base having an internally cylindrical portion to fit around the cylindrical portion of the body to provide a mounting for rotational movement of the head on the sight body about the axis of the beam of light falling on the screen from the lamp, means for clamping the base on the cylindrical portion of the body to secure the head in adjusted position, a pivotal connection between the carrier and the base to provide for angular adjustment of the reflector screen about an axis parallel with the screen and at right angles to the plane containing the line of sight and the axis of the beam of light falling on the screen from the lamp, a finger-operated crank device mounted in the base and operating about an axis parallel with the said pivotal axis and engaging with the carrier, by angular movement of which crank device the carrier is moved about the said pivotal axis, and means for fixing the crank device in adjusted position.

CHAS. D. MACGILL.